H. D. HUNTER.
DOUBLE DISK FURROW OPENER.
APPLICATION FILED FEB. 3, 1910.
990,654.
Patented Apr. 25, 1911.
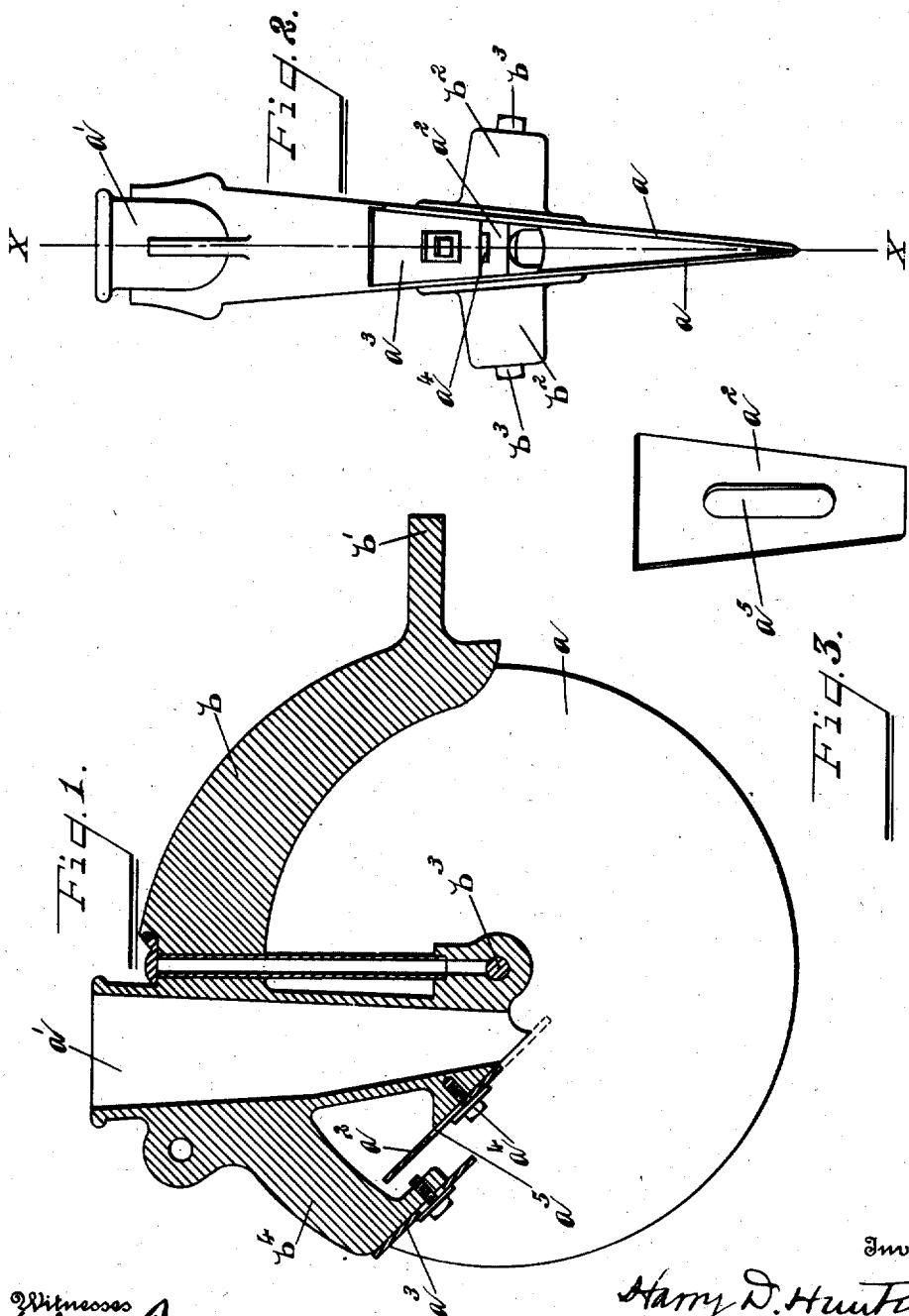

UNITED STATES PATENT OFFICE.

HARRY D. HUNTER, OF MARION, INDIANA, ASSIGNOR TO THE AMERICAN DRILL COMPANY, OF MARION, INDIANA, A CORPORATION OF INDIANA.

DOUBLE-DISK FURROW-OPENER.

990,654.  Specification of Letters Patent.  Patented Apr. 25, 1911.

Application filed February 3, 1910. Serial No. 541,870.

*To all whom it may concern:*

Be it known that I, HARRY D. HUNTER, a citizen of the United States, residing at Marion, in the county of Grant and State of Indiana, have invented certain new and useful Improvements in Double-Disk Furrow-Openers, of which the following is a specification.

This invention relates to improvements in grain drills and particularly to disk furrow openers known as the double disk type which consists in employing two twin disks rotating in unison having a conduit for feeding the grain to a point between the disks.

The object of the invention is to improve the efficiency of the complete device, and the difficulties to be overcome in prior structures lies in the fact that these double disk devices as well as other forms of furrow openers must be adapted to various kinds and conditions of seeding. For instance with the double disk type the condition of seeding may be such that little or no sticky ground will be encountered and for that reason it must be adapted to that kind of sowing, while for sticky and wet ground conditions will be entirely different, requiring a different arrangement of the parts composing the structure.

In the device shown herein the parts are so arranged that they can be used in sticky as well as dry and hard ground.

Referring to the drawings: Figure 1 is a vertical sectional view of a furrow opener embodying my improvements, the section being taken on the line $x$—$x$ of Fig. 2. Fig. 2 is a rear view of the same. Fig. 3 is a detail view of the valve.

Like parts are indicated by similar letters of reference throughout the several views.

In the accompanying drawings, $b$ represents the usual support for the furrow opening disks, having at the forward end thereof a projection $b^1$ to which the usual dragbar is attached, and also having formed integrally therein the usual conduit $a^1$. The twin disks $a$ are provided in the usual way with hubs $b^2$ which are journaled on laterally extending trunnions projecting from the lower end of the conduit, a bolt $b^3$ being adapted to hold the parts in position. These twin disks $a$ are journaled in the usual way at an angle to a vertical line with their forward or cutting edges converging.

It has been customary to end the conduit at a point substantially at the axial center of the disks, as indicated in Fig. 1, so that the seed will drop free from the conduit at a point substantially above the top of the furrow. In the ordinary sowing, where the ground is in the most desirable condition, this form of construction is entirely satisfactory, but in wet and sticky ground, where a considerable amount of seeding is done in the spring of the year, it is apparent that a scraper device must be employed for the disk and it has been quite customary to employ a scraper located between the twin disks such that it will scrape the adjacent sides of the disk and thereby keep the disks from clogging up, but where such scraper devices have been employed the danger is that the scrapers and rotating disks will both operate to prevent the proper seeding of the ground, for the seed falling at a point substantially near the center of the disks, will be exposed to the danger that the soil carried up by the disks and the scrapings deflected downwardly will interfere with the proper sowing of the seed. And while it is highly advantageous in some conditions of the soil to sow the seed at the widest point of the furrow and for that reason to locate the end of the conduit rearwardly from the center of the disk, yet in sticky conditions of the soil it is desirable to sow the seed at a point near the toe of the trench or close to the point of convergence of the disks. For that reason it has been usual to place the toe of the boot forward of the bearings of the disk. But in the improved construction illustrated and shown herein the end of the conduit is maintained at a point slightly to the rear of the center of the disk and other devices are employed to coöperate therewith so that the device can be adjusted to sow the seed at a point forward of the bearings of the disk and close to the point of convergence of the twin disks. To that end, there is employed a valve or chute $a^2$ so associated with the twin disks and the conduit that it may be adjusted to deflect the seed at a point forward of the center of the disk. This valve or chute $a^2$ is adjustably secured to the lower end of the conduit $a^1$; the said valve being provided with a slotted opening $a^5$ through which extends a screw $a^4$, screwed into the rear of the conduit $a^1$, which is faced off to receive the said valve; the construction being such that the valve or chute can be adjusted at an angle extending downwardly across the vertical center of said chute. This valve or chute $a^2$ is formed of a wedge shape so as to fit rather snugly between the respective disks and act more or less as a scraper. When the valve is adjusted to the position shown in the full lines in Fig. 1, the seed delivered from the bottom of the conduit will be permitted to drop straight down into the widest part of the furrow, which is a desirable manner of sowing in dry ground. When sowing under a wet and sticky condition of the soil the valve or chute may be adjusted downwardly into the position shown in dotted lines so as to deflect the seed delivered from the conduit to a point forwardly toward the toe of the trench so that the proper sowing of the seed will not be interfered with by the sticky soil and mud carried up by the disks.

In addition to the scraping effect produced by the valve or chute $a^2$ I have provided an additional scraper $a^3$ secured to a rearwardly extending portion $b^4$ of the support $b$, this scraper $a^3$ being adapted to act in conjunction with the valve or chute $a^2$ to scrape off the adhering mud and dirt.

Having thus described my invention, I claim:

1. In a double disk furrow opener, the combination of twin disks converging at their forward edges, a fixed conduit, an adjustable deflector secured near the lower end of the conduit capable of being projected to a point below the center of the disk whereby the adjustable deflector may operate to deflect the seed to a point at or near the toe of the trench and below the center of the disk, substantially as specified.

2. In a furrow opener, the combination of double disks meeting at their forward ends and diverging at the rear edge thereof, a conduit located at the rear of the disks and at the axes thereof, an adjustable scraper slidingly mounted near the lower end of the conduit and adapted to partially close the end of the conduit and deflect the seed forwardly and an additional scraper located rearwardly of the first mentioned scraper, substantially as specified.

In testimony whereof, I have hereunto set my hand this 21st day of January, 1910.

HARRY D. HUNTER.

Witnesses:
Jo Stuart,
Harriet P. Hunter.

---

Copies of this patent may be obtained for five cents each, by addressing the "Commissioner of Patents, Washington, D. C."